Dec. 7, 1954    L. F. ROEHMANN ET AL    2,696,518
SHIELDED CABLE TERMINAL
Filed Oct. 6, 1950
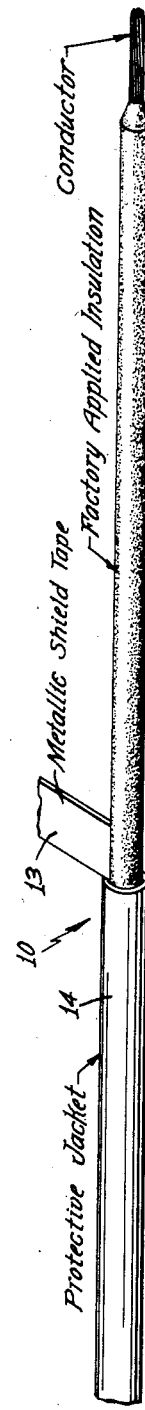
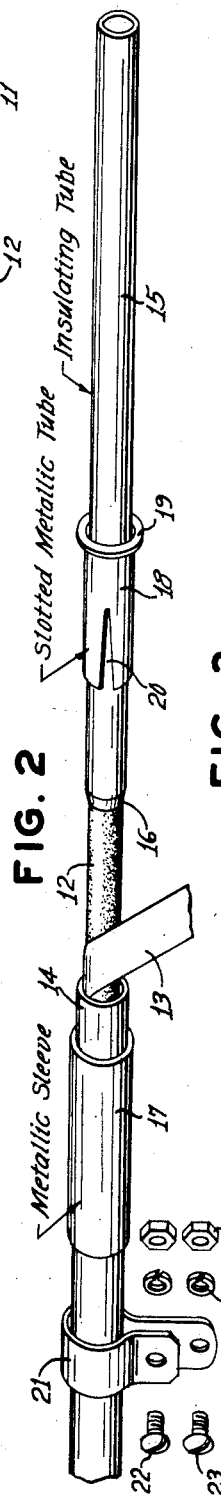
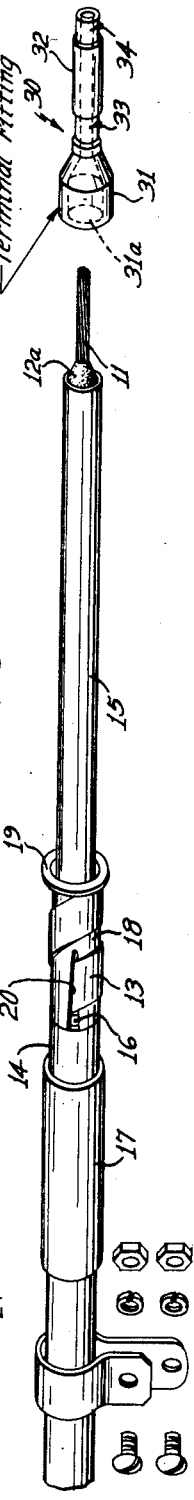
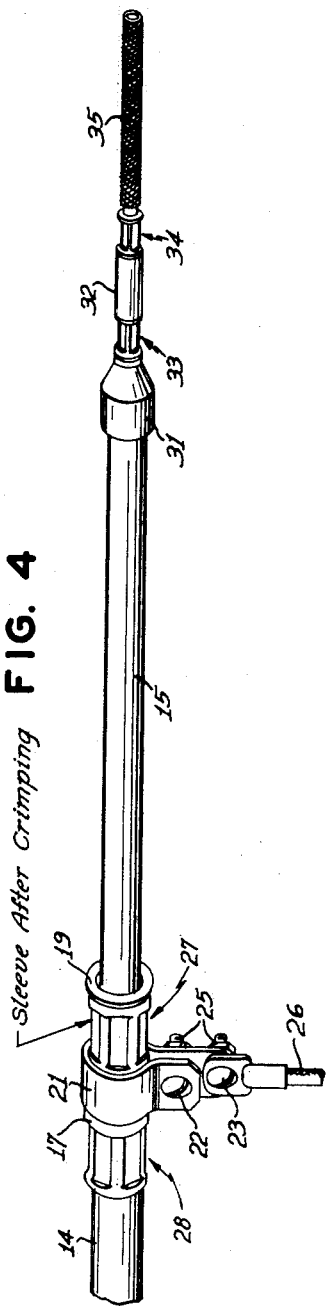
INVENTORS
Ludwic Franz Roehmann
Alexander Duncan
BY
ATTORNEYS

# United States Patent Office 2,696,518
Patented Dec. 7, 1954

2,696,518

SHIELDED CABLE TERMINAL

Ludwig Franz Roehmann, Hastings on Hudson, and Alexander Duncan, Yonkers, N. Y., assignors to Anaconda Wire and Cable Company, a corporation of Delaware Application October 6, 1950, Serial No. 188,804

6 Claims. (Cl. 174—78)

This invention relates to a terminal assembly for electric cables and in particular to a terminal for shielded electric cable for use in high voltage out-of-doors aerial installations.

Shielded cable commonly comprises a main conductor, a layer of insulation surrounding the conductor, a metallic shield surrounding the insulation, and an outer protective jacket of fabric or rubber compound. The termination of such cables in high voltage out-of-doors service presents substantial problems. There is a high concentration of electrical stress through the cable insulation, between conductor and shield, at the cable terminal; and in out-of-doors service the terminal must be resistant to both electrical and mechanical breakdown even when wet and traversed by high voltage discharges. By high voltages, we mean 600 volts or more, and up to voltages of 5000 or more (to ground). The termination of low-voltage cables presents no special problems, but at high voltages (600 or more to ground), the so-called pothead terminals have been the only terminals heretofore available that have proved reliable for out-of-doors use when they are exposed to rain, sleet, and all the other vagaries of the weather. Such terminals are made by building up the cable insulation at the terminal (between the end of the shield and the bared end of the main conductor) with a heavy application of insulation tapes, enclosing the so-taped end portion of the cable in a porcelain insulator, and then filling the space inside the insulator that is not occupied by the taped end portion of the cable with a compound (usually bituminous) which has insulating properties and is effective for sealing the porcelain against the ingress of moisture. The installation of pothead terminals is costly not only for the materials used but also because it requires the services of highly skilled mechanics both to apply the tapes correctly and to install and seal the pothead porcelain.

The present invention provides an improved and much simplified cable terminal assembly which requires no taping of the cable and no porcelain insulator, and which can be installed quickly and readily with a minimum of tools, even under awkward working conditions such as prevail atop power line poles, by linemen who are unskilled in the specialty of taping high voltage terminals and splices. The new terminal assembly possesses high tracking resistance when wet, provides for adequate and permanent termination of the cable shielding, and permits of easy connection of the cable shield to ground. It has been found to meet the electrical and mechanical requirements for reliable service out-of-doors even when fully exposed on poles to the weather.

In the new cable terminal assembly, the outer jacket of the cable is stripped back an appreciable distance from the end of the cable, and the shield is removed almost (but not quite) as far back as the jacket, leaving the insulation exposed. A tube of insulating material, which in out-of-doors service is preferably polyethylene, surrounds the exposed insulation, with the rearward end of this tube underlying the shield adjacent the point where the cable jacket terminates and the forward end extending substantially to the end of the cable. A metallic tube surrounds a short portion of the tube of insulating material at its rearward end in substantially abutting relation with the end of the cable jacket and underlies the cable shield. A metallic sleeve surrounds the shield where it overlies the metallic tube, and also surrounds the adjacent end portion of the cable jacket. This sleeve is circumferentially compressed tightly against the cable jacket to secure the sleeve to the cable, and also against the metallic tube whereby the shield is clamped tightly between the metallic tube and sleeve in good electrical contact therewith. A messenger wire for connecting the shield to ground may be clamped or otherwise secured to the sleeve. To complete the terminal assembly, a terminal fitting is secured to the cable conductor at the end of the cable adjacent the forward end of the tube of insulating material. This fitting also serves to secure the forward end of the insulating tube to the cable.

It is advantageous for the combined wall thickness of insulating tube and metallic tube to be substantially equal to the wall thickness of the cable jacket. Thus, the outside diameter of the cable will be substantially equal to the diameter of the terminal assembly before the outer metallic sleeve is drawn into position, and said sleeve will then fit smoothly over both cable jacket and metallic tube.

To minimize the concentration of electrical stress at the point where the cable shield terminates electrically (that is, at the point nearest the end of the cable where the assembly of metallic tube, cable shield and metallic sleeve terminates), the forward edge of the metallic tube is flared outwardly to form a convexly curved flange. Thus there is no sharp conducting edge adjacent the underlying tube of insulation where lines of force might concentrate and subject the insulation to excessive electrical stress. In addition, this flange improves the appearance of the terminal, and simplifies its installation by providing a convenient stop against which the end of the metallic sleeve may be placed prior to final crimping of the sleeve against the underlying shield and metallic tube. (Alternatively, the convexly curved flange may be formed at the forward end of the metallic sleeve, instead of at the forward end of the tube, and in such case the sleeve is applied so that its flanged end projects beyond the forward end of the tube and preferably is there compressed against the tube of insulating material. This alternative is the electrical equivalent of the structure just described.)

If the cable shield is in the form of wire braid or the like, the metallic tube may be a simple cylindrical shape and the shield may be drawn smoothly over the tube prior to slipping the outer sleeve into place over it. If the shield is formed of a helically wound metallic tape, the metal tube is formed with a longitudinal slot at its rearward end, through which the shield tape may be brought out and wound or wrapped around said tube.

The accompanying drawings show a preferred embodiment of the invention and illustrate the method by which the new terminal fitting is applied to shielded cable. In the drawings, Fig. 1 shows shielded cable prepared to receive the terminal fitting;

Fig. 2 and Fig. 3 show steps in the assembly of the terminal, and

Fig. 4 shows the completed cable terminal assembly.

Referring first to Fig. 1, a shielded cable 10 comprising a conductor 11 surrounded successively by a layer of insulation 12, a shield of helically wound metal tape 13, and a non-conducting outer protective jacket 14 is prepared to receive the new terminal assembly by baring a short length of the conductor 11 at the end of the cable and removing an appreciable length of the protective jacket 14 so that the metal tape 13 is exposed and may be unwound from around the cable insulation 12 back to the point to which the jacket 14 is removed. As an example of what is meant by terminating the protective jacket an "appreciable" distance from the end of the cable, a 5000 volt shielded cable having a factory-applied insulation of butyl rubber 5/32 inch thick advantageously has the protective jacket and metal tape shield removed to expose the insulation 12 for a distance of about 13 inches. For cables used at other voltages, and with other thicknesses and types of factory-applied insulation 12, the length of jacket removed may vary considerably from 13 inches, but usually it is in the range from 6 inches to 2 feet.

Fig. 2 illustrates the first step in the application of the new terminal assembly to the prepared cable. A tube 15 of insulating material, preferably of extruded polyethylene, formed with a tapered end 16 and of substantially the same length as the length of exposed insulation 12, is slipped over the exposed insulation, tapered end first. The inside diameter of the insulating tube 15 should be substantially equal to the outside diameter of the cable insulation 12. A metallic sleeve 17, preferably of copper, is then slipped over the end of the cable and is temporarily positioned at some point to the rear of the end of the cable jacket 14. A metallic tube 18, preferably of copper, which is formed with an outwardly curving flange 19 at its forward end and with a longitudinal slot 20 at its rearward end, is slipped over the tube 12 slotted end first. The inside diameter of the tube 18 should substantially equal the outside diameter of insulating tube 15, and the combined wall thickness of these two tubes should be substantially equal to the wall thickness of jacket 14 (i. e. the outside diameter of the metallic tube 18 should approximately equal the outside diameter of the cable jacket). The inside diameter of the sleeve 17 should be substantially equal to the outside diameter of jacket 14 (and tube 18) so that the sleeve will fit rather closely over both jacket and tube. A clamp 21, supplied with bolts 22 and 23, lockwashers 24 and nuts 25, may be provided as a means for connecting a ground messenger wire 26 to the sleeve 20.

Fig. 3 illustrates succeeding steps in the application of the terminal assembly. The insulating tube 15 is positioned so that its tapered rearward end 16 underlies a portion of the shield tape 13 and substantially abuts the end of the jacket 14. The tapered end of the tube 15 aids in enabling the tube to be forced underneath the tape 13 and against the jacket 14. The forward end of the tube 15 should now be substantially even with the end 12a of the cable insulation. The metal tube 18 is positioned over the rearward end portion of the insulating tube 15 so that its slotted end substantially abuts the end of jacket 14. The shield tape 13 is brought out from under this tube through its slot 20 and is then wrapped once or so about it, after which any excess of the tape is trimmed off. (If the cable shield were formed of wire braid, the tube 18 would simply be slipped underneath the shield, and the shield then drawn smoothly over its outside surface. Again the excess of shield material would be trimmed off.)

The final steps leading to the completion of the terminal assembly are illustrated in Fig. 4. After the insulating tube 15 and the metallic tube 18 are positioned as just described, the sleeve 17 is drawn forward so that it overlies the tube 18 and the shield tape wrapped thereon. The forward end of the sleeve 17 substantially abuts the tube flange 19 while its rearward end overlies a portion of the jacket 14. The forward end portion 27 of the sleeve then is circumferentially compressed, or crimped, against the tube 18 so that the shield tape 13 is tightly clamped between the sleeve 17 and the tube 18 and is thereby secured in good electrical contact with them. The rearward end portion 28 of the sleeve 17 is similarly crimped against the cable jacket 14 so that both the sleeve 17 and the tube 18 are anchored securely in position. The shield terminal is completed by placing the messenger clamp 21 over the sleeve 17, preferably at its uncrimped central portion, and securing it in position with bolt 22, lockwasher 24 and nut 25. The clamp 21 makes good electrical contact with the sleeve 20 and is, in turn, connected by the messenger wire 26 to ground.

The terminal assembly is completed by a terminal fitting 30 which provides an electrical connection with the cable conductor 11. The terminal fitting also serves to hold the forward end of the insulating tube 15 in place. In the form shown in Figs. 3 and 4, the terminal fitting 30 has an enlarged cylindrical portion 31 having a central opening 31a adapted to receive the forward end portion of the tube 15, and a hollow shank 32 formed with circumferentially recessed portions 33 and 34. The bared end of the conductor 11 is inserted in the hollow shank 32 and the fitting is pushed back along the cable as far as it will go, so that the forward end of the insulating tube 15 is inserted substantially to the full depth of the opening 31a. The recessed portion 33 of the shank then is crimped against the conductor 11, forming a permanent electrical connection therewith. A wire or other conductor 35 may then be inserted in the open end of hollow shank 32 and its recessed portion 34 may be crimped against the wire to form a permanent electrical connection therewith and to complete the connection of the cable to the apparatus it is intended to serve. Of course, it will be understood that the invention is not limited to any particular form of terminal fitting 30. Instead of the hollow shank 32, the fitting 30 might be formed with an eye, a spade lug, a jack, or any other of the conventional electrical terminals.

It is apparent from the foregoing that with the new terminal assembly the factory applied insulation, between the metallic terminal fitting 30 forming the connector for the conductor 11 and the metallic tube 18 forming a part of the connector for the shield, is fully protected by the insulating tube 15. We have found that when the tube 15 is of polyethylene, the terminal assembly gives reliable service out-of-doors even when fully exposed to the weather. We have discovered that polyethylene possesses exceptionally high tracking resistance (i. e. it possesses high resistance to the flow of leakage currents along its surface from the live connector to the grounded connector) even when wet with water or salt spray. Furthermore, its good electrical properties in this and other respects, and its good mechanical properties, are not adversely affected by prolonged exposure to freezing conditions, or to the hot sun, or to dry or humid atmospheres, or to other weather conditions. Accordingly the new cable terminal is well suited to out-of-door service where its performance is fully as satisfactory as the much more complex taped and porcelain-insulated pothead terminals that heretofore have been the only acceptable terminals for high voltage service out-of-doors.

We claim:

1. In combination with a cable comprising a conductor surrounded by a layer of insulation and having a metallic shield tape surrounding the layer of insulation, a cable terminal assembly comprising a tube of insulating material surrounding said layer of insulation with its forward end adjacent the end of the conductor and its rearward end underlying the shield tape at a point an appreciable distance back from the end of the cable, a longitudinally slotted metallic tube surrounding a short portion of said tube of insulating material adjacent its rearward end, the shield tape being brought out through the slot in said metallic tube and being wrapped therearound, a metallic sleeve surrounding the shield tape where it is wrapped around the metallic tube, said sleeve being compressed tightly in place so as to clamp the shield tape securely between the sleeve and the metallic tube, a ground connector clamped to said sleeve, and a terminal fitting secured to the cable conductor adjacent the forward end of the tube of insulating material.

2. The combination with a cable comprising a conductor surrounded by a layer of insulation and having an electrically conducting shield surrounding said layer of insulation and a protective jacket surrounding the shield, said jacket and shield terminating an appreciable distance back from the end of the cable, of a cable terminal assembly comprising a tube of insulating material surrounding the layer of insulation with its rearward end underlying the shield adjacent the point where the cable jacket terminates and with its forward end extending substantially to the end of the cable, a metallic tube substantially abutting the end of the cable jacket and surrounding a short portion of said tube of insulating material at its rearward end and also underlying said shield, the combined wall thickness of the tube of insulating material and of the surrounding metallic tube being substantially equal to the wall thickness of the abutting end of the cable jacket, a metallic sleeve surrounding both the shield where it overlies the metallic tube and the adjacent end portion of the cable jacket, said sleeve being compressed tightly against both the cable jacket and the metallic tube, whereby the shield is clamped tightly between said tube and sleeve in good electrical contact therewith and the metallic tube is secured in substantially abutting relation with the end of the jacket, and a terminal fitting secured to the cable conductor adjacent the forward end of said tube of insulating material.

3. The combination with a cable comprising a conductor surrounded by a layer of insulation and having a metallic shield tape wrapped helically about the layer of insulation and an outer protective jacket terminating an appreciable distance back from the end of the cable, of a terminal assembly for the shield tape comprising a longitudinally slotted metallic tube surrounding the layer of insulation in substantially abutting relation with the end of the jacket, the shield tape being brought out through the slot in said metallic tube and being wrapped therearound, and a metallic sleeve surrounding both the shield tape where it is wrapped about the metallic tube and the adjacent end portion of the cable jacket, said sleeve being compressed tightly against both the cable jacket and the metallic tube with the result that shield tape is clamped tightly between said tube and sleeve in good electrical contact therewith and the shield terminal assembly is secured to the cable jacket.

4. A shield terminal fitting for a cable having a metallic shield tape applied helically thereto, comprising a tube of insulating material, a longitudinally slotted metallic tube having an inside diameter substantially equal to the outside diameter of said tube of insulating material and adapted to be drawn over one end portion thereof, and a metallic sleeve of inside diameter substantially equal to the outside diameter of said metallic tube and adapted to be drawn thereover and compressed thereagainst, the slot in the metallic tube permitting the shield tape to be drawn therethrough when the metallic tube is brought into juxtaposition with said tape and thus affording compressive contact between the metallic sleeve and the tape when the former is compressed as aforesaid.

5. A shield terminal fitting for a shielded electric cable comprising a tube of insulating material, an appreciably shorter metallic tube having an inside diameter substantially equal to the outside diameter of said tube of insulating material and adapted to be drawn over one end portion thereof, the forward end of said sleeve being flared outwardly to form a convexly curved flange adapted to minimize electrical stress concentration thereat, and a metallic sleeve of inside diameter substantially equal to the outside diameter of said metallic tube and adapted to be drawn thereover and compressed thereagainst.

6. The combination with a cable comprising a conductor surrounded by a layer of insulation and having an electrically conducting shield surrounding said layer of insulation and a protective jacket surrounding the shield, said jacket terminating an appreciable distance back from the end of the cable, of a terminal assembly for the shield comprising a metallic tube of substantially the same outside diameter as the cable jacket surrounding the layer of insulation and underlying the shield with its rearward end substantially abutting the end of the cable jacket and with its forward end flared outwardly to form a convexly curved flange adapted to minimize electrical stress concentration, and a metallic sleeve surrounding both the shield where it overlies the metallic tube and the adjacent end portion of the jacket, said sleeve being compressed tightly against both the cable jacket and the metallic tube with the result that the shield is clamped tightly between said tube and sleeve in good electrical contact therewith and the resulting shield terminal assembly is secured to the cable jacket at the end thereof.

References Cited in the file of this patent

UNITED STATES PATENTS

| Number | Name | Date |
|---|---|---|
| 1,504,630 | Lilleberg | Aug. 12, 1924 |
| 1,981,753 | Pearson | Nov. 20, 1934 |
| 2,030,080 | Waldron | Feb. 11, 1936 |
| 2,036,414 | Jore | Apr. 7, 1936 |
| 2,406,805 | Clark | Sept. 3, 1946 |
| 2,536,003 | Dupre | Dec. 26, 1950 |
| 2,549,665 | Conrad | Apr. 17, 1951 |